United States Patent [19]

Hauck

[11] Patent Number: 5,471,636

[45] Date of Patent: Nov. 28, 1995

[54] SOFTWARE DEVELOPMENT SYSTEM AND METHOD OF USING SAME

[76] Inventor: Lane T. Hauck, 5346 Bragg St., San Diego, Calif. 92122

[21] Appl. No.: 254,156

[22] Filed: Jun. 6, 1994

[51] Int. Cl.⁶ .................................................. G06F 13/00
[52] U.S. Cl. .................... 395/800; 364/964.2; 364/243.0
[58] Field of Search .................................... 395/700, 425, 395/700, 800

[56] References Cited

U.S. PATENT DOCUMENTS

| | | | |
|---|---|---|---|
| 4,231,087 | 10/1980 | Hunsberger | 395/375 |
| 4,441,154 | 4/1984 | McDonongh | 395/800 |
| 5,175,856 | 12/1992 | Van Dyke | 395/700 |
| 5,185,867 | 2/1993 | Ito | 395/375 |
| 5,191,646 | 3/1993 | Naito et al. | 395/161 |
| 5,201,050 | 4/1993 | McKeeman et al. | 395/700 |
| 5,325,531 | 6/1994 | McKeeman et al. | 395/700 |

*Primary Examiner*—David Y. Eng
*Attorney, Agent, or Firm*—Bernard L. Kleinke; Jerry R. Potts; Peter P. Scott

[57] ABSTRACT

A new and improved software development system which can be utilized to create a presentation program includes a high speed memory device for storing data files indicative of an untested presentation program and a processor coupled to the storage unit for sending desired data files in place of target files at a start time corresponding to actual access time exhibited by a low speed drive unit in retrieving the target files from an associated storage media device for transfer to a host computer. Subsequently, after a user has developed a tested presentation program, the development system retrieves and supplies the tested presentation program to a low speed drive unit which causes the program to be stored on a master storage media device.

17 Claims, 3 Drawing Sheets

SOFTWARE DEVELOPMENT SYSTEM AND METHOD OF USING SAME

TECHNICAL FIELD

The present invention relate to methods and systems for developing and testing software presentation programs. More specifically, the present invention relates to a development system and method for testing software presentation programs intended to be embodied in a storage media device, such as an optical compact disc read only memory (CD-ROM) storage device.

BACKGROUND ART

The compact disc read only memory storage device is a very popular device for storing and economically delivering large quantities of computer data. For example, current technology permits storage of about 600 megabytes of data on a single CD-ROM. Such a CD-ROM storage device can be manufactured and packaged very inexpensively, making it a very attractive carrier of computer data including text, graphics, sound, and full-motion video.

To create software specifically adapted for a CD-ROM device, software development systems have been employed, using personal computers. Such development systems use hard disk memories to store information to be transferred to a CD-ROM device. Unfortunately, the retrieval characteristics of CD-ROM devices and hard disks are very different, thereby making it difficult or impossible to emulate closely the characteristics of the CD-ROM drive using a hard disk. For example, the average access time for a fast hard disk memory is about 15 milliseconds, as compared to 300 milliseconds for a CD-ROM drive. Also, a conventional hard disk memory can transfer data at 5–10 megabytes per second, whereas, a conventional CD-ROM drive can transfer data at about 300 kilobytes per second.

Such incompatibilities in performance capabilities may not be a significant problem for a CD-ROM software development system, especially where the data is not relatively complex. For example, the data rate required from the CD-ROM device for text files or audio data is relatively constant, and well within the 300 kilobytes per second limit.

However, a problem exists where complex presentation applications are to be developed and tested employing multiple streams of high-bandwidth data to be retrieved in a substantially simultaneous manner. For example, three simultaneous data "tracks" may be required. The first track can be a digitized and compressed movie, the second track can be a stereo music clip, and the third track can be a graphics animation. Since the bandwidth of the CD-ROM device is limited to 300 kilobytes per second, sophisticated techniques must be employed which interleave the three data streams and buffer the individual streams so that they can be retrieved substantially simultaneously, in the desired synchronization to achieve a desired presentation, such as a multi-media presentation.

In such multi-media presentations, the timing of the data retrieved from the CD-ROM device is critical. In this regard, the physical arrangement of the different data streams on the disc device determines the overall performance of the system. If a block of sound data is located at a position on the CD-ROM device requiring a head seek operation, the retrieval of one or more of the streams currently playing is likely interrupted. Time consuming experimentation and fine tuning of file placement on the CD-ROM device may be required to make such presentation applications perform properly.

For this reason, it is critical to duplicate, as closely as possible, the retrieval characteristics of the CD-ROM drive when testing application software. A multi-media application software can be executed perfectly on a development system, where all of the data is retrieved from its hard disk memory. However, when a copy of the multi-media software is transferred to a CD-ROM device, the resulting stored application software may not execute entirely satisfactory. For example, unwanted breaks in the video and sound may result when the software is executed from the CD-ROM device.

For this reason, attempts have been made to emulate as closely as possible, the characteristics of a CD-ROM drive of a software development system. One such attempt is disclosed in U.S. Pat. No. 5,121,492. The system disclosed therein emulates the access characteristics of a multi-media storage drive unit by calculating its characteristic features, such as the estimated delays, seek times, motor dynamics and data transfer rates of the drive unit. While such a calculating technique may be sufficient for less complex text or audio files, it is not entirely satisfactory for those applications requiring multiple streams of high bandwidth data to be retrieved in a desired simultaneous manner. In this regard, because the calculations are derived from a model of a mechanical system (the CD-ROM drive), the derived mechanical characteristics do not always closely emulate the actual mechanical characteristics satisfactorily.

Due to the incompatibilities of the developmental system hard disc drive and a CD-ROM device, even when the access characteristics are calculated, undesirable results can occur. Since the calculations are only an approximation, repeated attempts must be made. In the course of unwanted and expensive developing and testing an application, many iterations of individual CD-ROM devices are required to be recorded for testing.

As a result, when a multi-media presentation application software is being developed for a master CD-ROM device, the software designer must have an expensive master CD-ROM device created to determine whether or not the resulting software can be executed in the desired manner. In this regard, the designer must wait until the master device is prepared, and then the resulting software can be tested to ascertain whether or not all of the tracks of information can be retrieved in the desired synchronized manner.

Once the extent and nature of the undesired results are determined, the designer must revise the software to be developed by again utilizing the development system. The data placement on the CD must be revised in a further attempt to achieve the desired result of creating a master CD-ROM device, which can enable the resulting presentation software to be executed in the desired synchronized manner.

Thereafter, a copy of the revised software must then be used to make another expensive master CD-ROM device. Thus, additional expense is incurred, and time is lost in the making of another master device.

This iterative developmental process can be repeated several times. Thus, the overall time and expense in developing a master CD-ROM device is excessive.

Thus, it would be highly desirable to have a new and improved software development system, which could enable the software being developed to be completely developed and tested without the unwanted and undesired creation of multiple iterations of test master CD-ROM devices. In this manner, the testing should be able to be performed more quickly and easily.

DISCLOSURE OF INVENTION

Therefore, the principal object of the present invention is to provide a new and improved software development system and method of using it wherein a desired multi-track presentation program may be easily and efficiently created.

Another object of the present invention is to provide such a system and method, which enables such development software to be fully tested without undesirable delays and expensive costs associated with the creation of multiple numbers of storage devices.

Briefly, the above and further objects of the present invention are realized by providing a new and improved multi-track presentation software development system for use with a host computer system and a multi-track storage unit having a controller and low speed drive unit which enables a user to physically sense the interaction between groups of desired data track segments as they are developed into sequenced segments indicative of a desired multi-track presentation program. The software development system and the multi-track storage unit each respond to requests from the host computer to access target information data to facilitate software development.

The development system for creating a tested multi-track presentation program storage media device includes a high speed memory device for storing data files indicative of a raw or untested multi-track presentation program and processor coupled to the multi-track storage unit for determining a start time for sending desired data files in place of target files retrieved by the low speed drive unit from its associated storage media device.

The determined start time corresponds to the actual time the low speed storage drive unit would otherwise supply the retrieved target data to the host computer. Subsequently, after the user has developed the multi-track presentation program, the development system retrieves and supplies the tested presentation program to the low speed drive unit which allows the program to be stored on the storage media device in place of the target information data.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
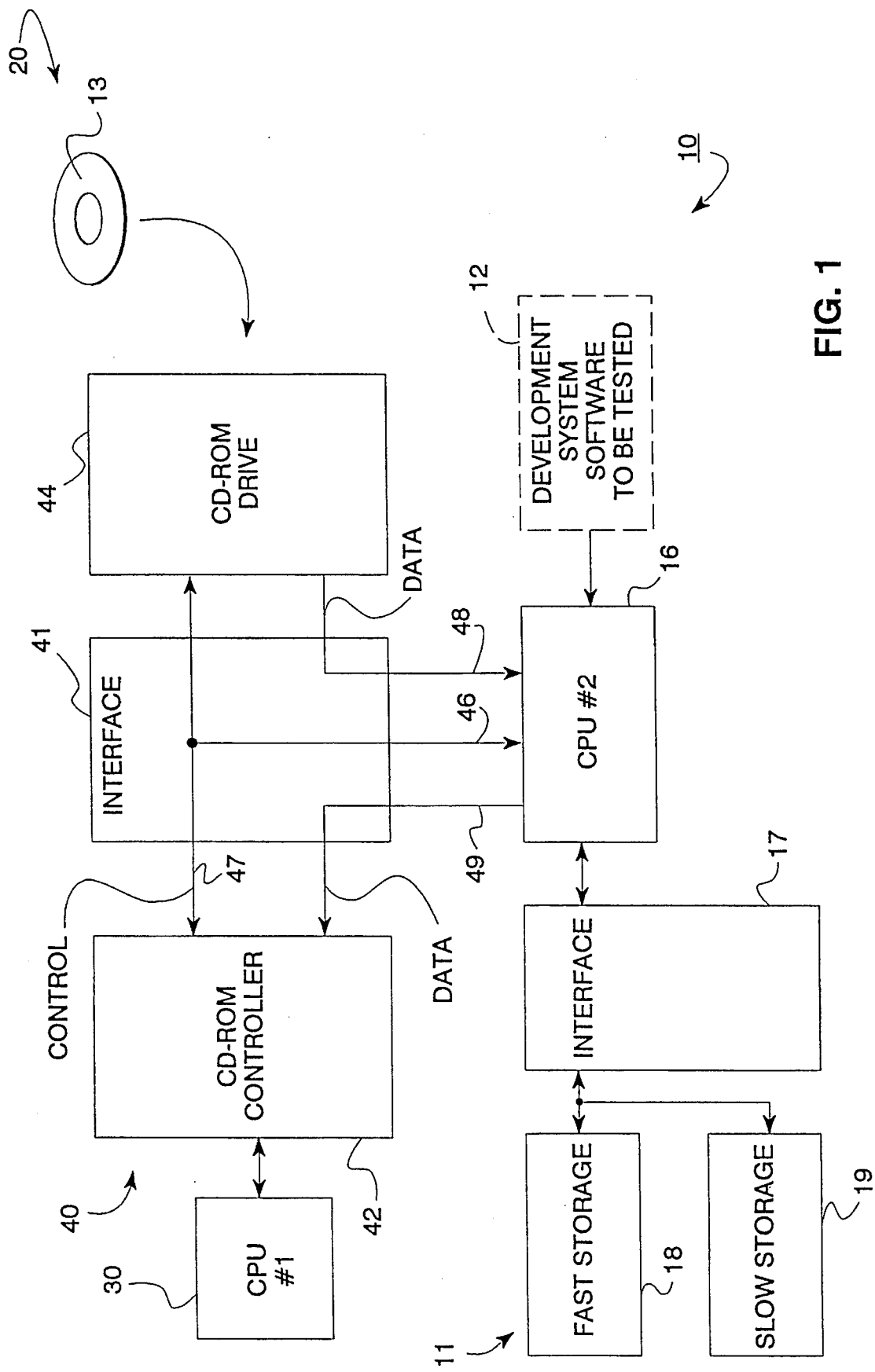
FIG. 1 is a system block diagram of a software development system which is constructed in accordance with the present invention.

Referring now to the drawings, and more particularly to FIG. 1 thereof, there is shown a multi-track presentation software development system 10 for creating and testing multi-media application software on a multi-track storage device, such as a CD-ROM device 13. The method of developing and testing the presentation program on the system 10, enables experimentation and fine tuning of the physical placement of data files on a master CD-ROM device in its intended playback environment without the delays and costs associated with creating multiple iterations of test storage devices. In this regard, the system 10 enables overall performance issue relating to the relatively slow retrieval speed of conventional CD-ROM drive units to be conveniently and thoroughly tested prior to creating the master disc.

The multi-track software development system 10 is coupled electrically to a target host system 20 having a host computer 30 and CD-ROM unit 40. The CD-ROM unit 40 includes a CD-ROM controller 42 and a target CD-ROM drive unit 44. The host computer 30 and CD-ROM unit 40 are electrically coupled together by an interface 41, such as a conventional Small Computer Systems Interface (SCSI). The SCSI interface 41 and its protocol are more fully described in an ANSI standard document entitled X3.131-1986 and will not be described in greater detail herein.

With respect to the SCSI interface 41, those skilled in the art will understand that there are various other ways to interface or connect a host computer to a CD-ROM unit. In this regard, certain ones of such interfaces, such as the SCSI interface 41 are standard, while certain other interfaces are proprietary to the drive manufacturer. Thus, while the interface described herein relates to the SCSI interface, it should be understood this is only an example of one interface technique, and that the principles described herein can be readily adapted to other drive unit interfaces.

Considering now the development system 10 in greater detail with reference to FIG. 1, the development system 10 generally includes an application program debugging system 11 having a central processor unit 16 such as a Macintosh computer model 68000 PC with an SCSI port and a hard disk storage unit 18. The central processing unit 16 is coupled electrically to the target host system 20 via the interface 41 and is responsive to control signals or commands generated by the CD-ROM unit 40. In this regard, the target CD-ROM unit 40 is interfaced to the application program debugging system 11 via the SCSI interface 41 which includes a set of control information cables 46 and 47 and a set of data information cables 48 and 49, respectively.

The hard disk 18 is interfaced to the central processor 16 and initially stores a set of untested data files 12 indicative of raw development software to be debugged and tested in its playback environment. In this regard, a large number of resource devices (not shown) for helping to produce the development software are used to transfer data files to the hard disk 18. In this regard, those skilled in the art will understand the central processor unit 16 is interfaced to the hard disk 18 via another interface, such as another SCSI interface 17.

As best seen in FIG. 1, the application program system 10 also includes a slow speed storage unit, such as another CD-ROM unit 19 having both read and write capabilities. In this regard, once a system program has been developed, it may be either downloaded onto a blank master CD-ROM device (not shown) in the CD-ROM unit 19 or alternately, the system program may be delivered (by means not shown) to a conventional CD-ROM mastering process center (not shown).

A programmer/user (not shown) utilizing the application program development system 10 assembles the desired data files from the various resource devices into desired sequences with an associated application program in a C-language format. This raw development software program 12 and its associated data files are untested and would otherwise need to be placed on a master CD-ROM device for testing and debugging purposes.

The application program development system 10 of the present invention, permits the raw development software program to be tested without the creation of a master CD-ROM device. In this regard, the development system 10 is interfaced to the host computer system 20 so the programmer/user can now test and debug the raw program which is stored on the hard disk storage unit 18.

Considering now the operation of the system 10 in greater detail, in operation, after storage of the raw development software in the hard disk storage unit 18, the host computer 30 selects the CD-ROM drive 44 which in turn acknowledges its connection via the CD-ROM controller 42. The CD-ROM drive 44 then requests the host computer 30 to send a command data block (CDB) to tell the drive 44 what operation is requested. The host computer 30 responds, by sending a command data block which consists of multiple bytes of information specifying what data is to be read from the CD-ROM storage media device 13. The CD-ROM unit 40 interprets the command as a "read data" command which causes the CD-ROM controller 42 to send control information, such as a "seek track 23" to the CD-ROM drive unit 44 via the control information cable 46.

It should be understood by those skilled in the art, that the device 13 is not a master. In this regard, the device 13 is merely a dummy device that will be accessed by the CD-ROM drive 44 for the purpose of testing the raw program stored on the fast storage device 18. The device 18 in combination with the processor 16 emulates the actual access characteristics of the CD-ROM drive 44 as will be explained hereinafter.

For the purpose of developing the desired program, the actual CD-ROM drive unit selected for testing purposes, such as the unit 44, should have the maximum access time allowed for the unit to meet its specifications. Such a selection process will ensure that the developed software 12 will operate successfully on any compatible CD-ROM drive unit having the same or faster access characteristics.

The CD-ROM drive unit 44 then accesses the target CD-ROM storage device 13 removably installed therewithin by positioning its optical stylus (not shown) or read head (not shown) to the desired data file or track, such as track 23 on the target disc 13. This positioning of the read head is a mechanical operation indicative of the access characteristics of the CD-ROM drive unit 44. Once the data file has been accessed, target data information or files begin to flow from the target disc 13 to the host computer 30 via a request (REQ) and acknowledge (ACK) handshake procedure 70 to be described hereinafter.

As best seen in FIG. 1, when the CD-ROM controller 42 sends the command data block "read data," the command is also coupled to or intercepted by the central processing unit 16, which in turn retrieves the developmental data files 12 from the hard disk storage unit 18. Those untested or development data files on the storage unit 18 correspond to the requested target data files that would otherwise be stored on the device 13

Since the access time of the storage unit 18 is substantially faster than the access time of the CD-ROM drive unit 44, the central processing unit 16 will have acquired the desired development data from its storage unit 18 before the target data begins to flow from the drive unit 44. This fast storage disk data or development data from the storage unit 18 is placed on the data line 49 and read by the host computer 30 in lieu of the target data that the CD-ROM drive places on the data line 48.

The development data which has been previously stored in the storage unit 18 as noted earlier is indicative of the different data streams or files which must be interleaved and arranged to play in perfect synchronization when recorded onto a master disc, such as the target disc 13.

The central processing unit 16 synchronizes its operation via the REQ-ACK handshaking sequence 70 by substituting the hard disk data stream or the acquired development data files for the target data files. Thus, the development data files are sent to the host computer 30 via the CD-ROM controller 42. Because the central processing unit 16 can access selected development data files from the storage unit 18 at a much faster rate than the CD-ROM drive unit 44 can access the target data, the processing unit 16 can send its substituted data to the CD-ROM controller 42 using the same timing as the target data arriving from the CD-ROM drive unit 44.

In this manner, the exact delays, seek times, motor dynamics, data transfer rates and other access characteristics of the drive unit 44 are precisely duplicated since the target drive unit 44 itself is used for all mechanical operations, yet the data information supplied to the CD-ROM controller 42 originates from the development system 10 instead of the target disc 13 in the drive unit 44.

The data from the CD-ROM controller 42 is then supplied to the host computer 30, which in turn causes the data to be transformed into video and audio information which may be physically perceived by a software developer (not shown).

In this manner, the software developer may easily and efficiently arrange the data files on the storage unit 18 by means not shown, so that the overall performance issues relating to the relatively slow retrieval speed of the CD-ROM drive unit 44 may be conveniently and thoroughly tested in the playback environment.

Once the development software has been created and thoroughly tested, the developed software which is indicative of a desired presentation or multi-media program is transferred or written to the target compact disc 13. In this manner, the fully debugged multi-media program is stored on the master disc 13 without unwanted delays and undesired costs otherwise associated with creating multiple iterations of test discs.

Figure 2:
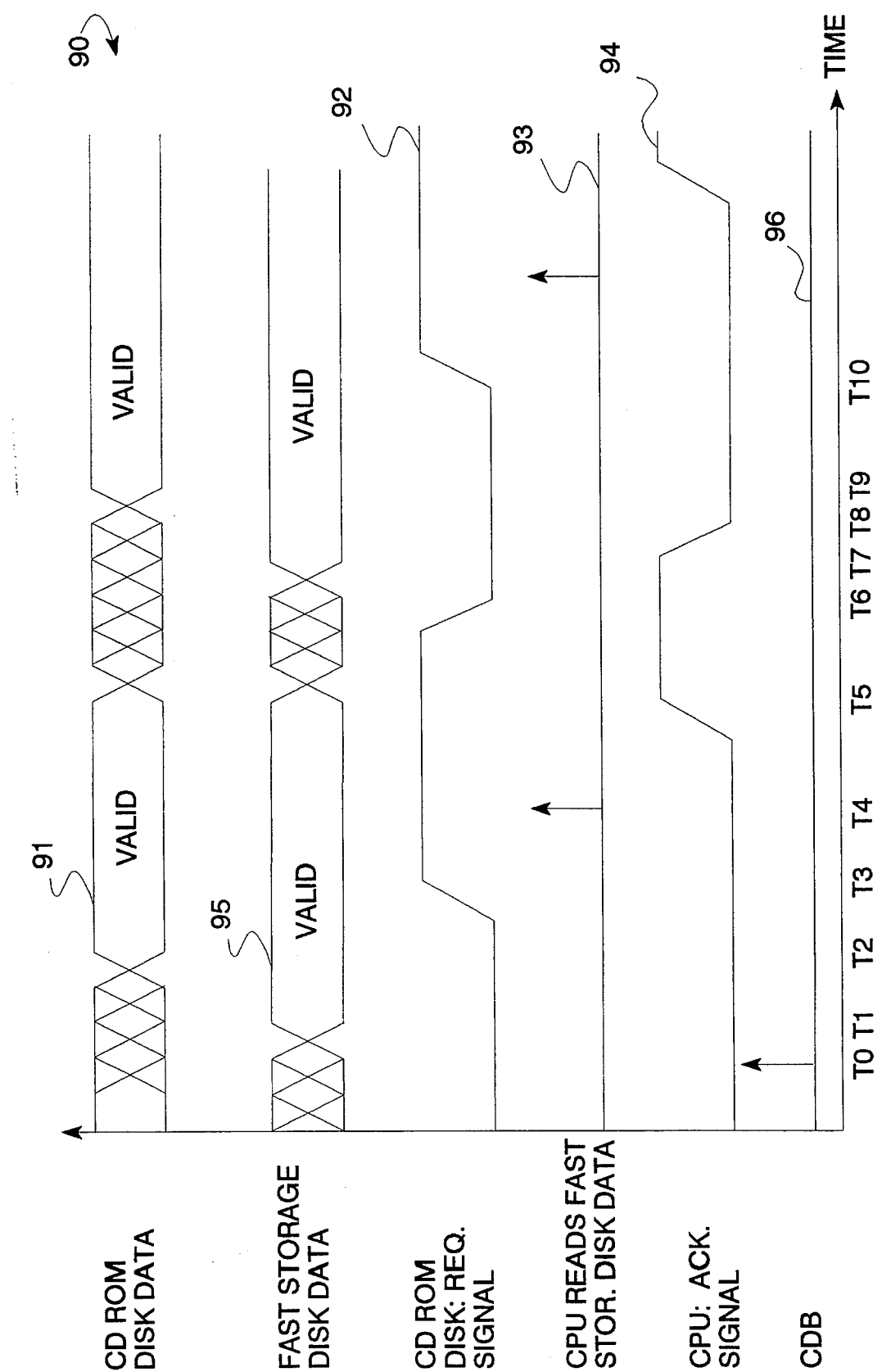
FIG. 2 is a timing diagram illustrating command and data signals between the development system of FIG. 1 and its intended environment.

Considering now the SCSI interface 41 in greater detail with reference to FIGS. 1 and 2, the SCSI interface 41 generally includes eight bidirectional data lines and control lines which control bus arbitration, data direction and data synchronization. In this regard, when the host computer 30 connects to the target drive unit 44, data is transferred in an asynchronous mode.

Figure 3:
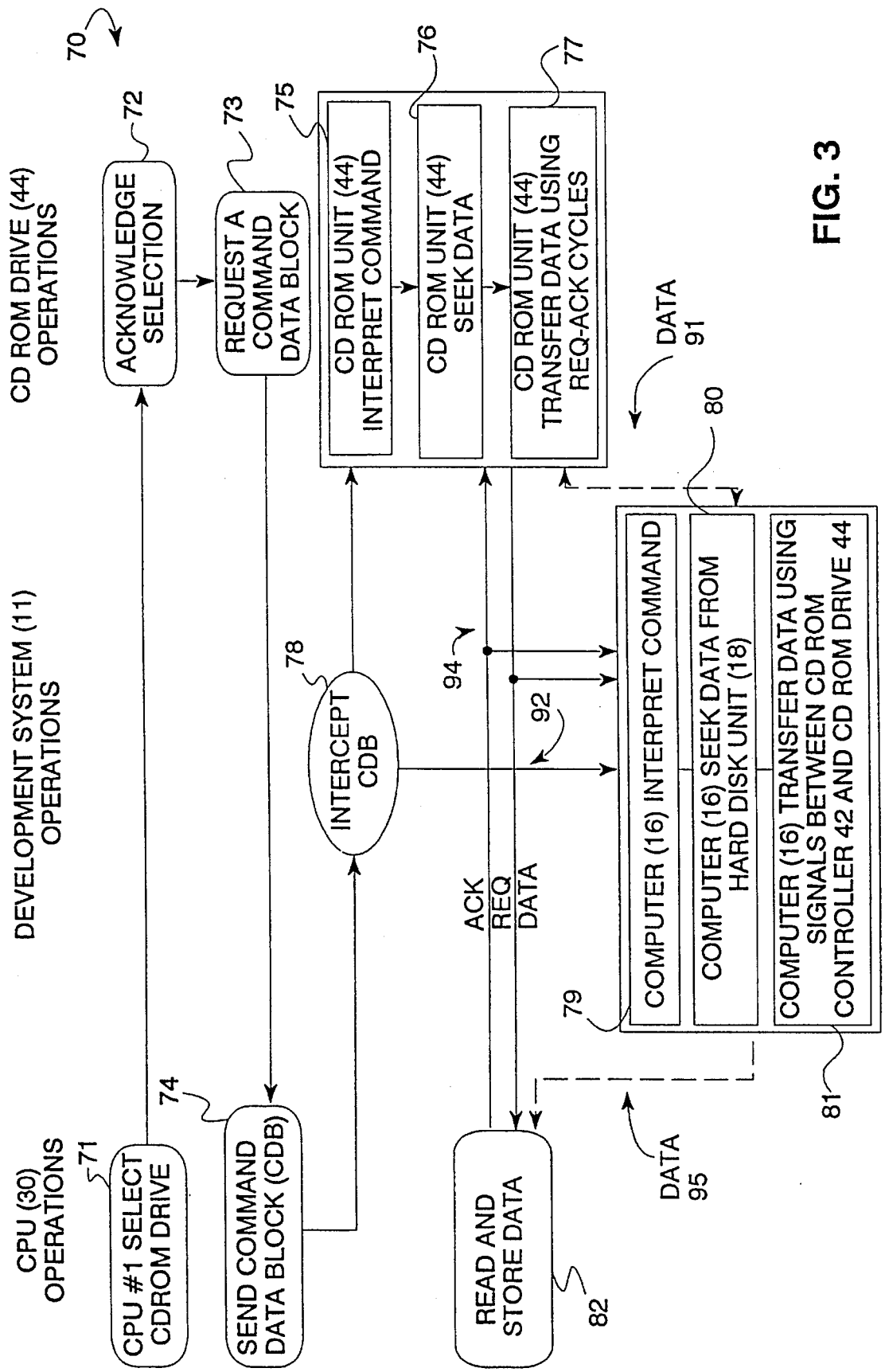
FIG. 3 is a flow chart illustrating data transfer request between a host computer and a CD-ROM drive in the intended environment of FIG. 1.

For example, FIGS. 2 and 3 illustrate of the asynchronous mode of operation relative to the SCSI control signals, that directly control the data transfer timing.

Considering now the operations in greater detail with reference to FIG. 3, on the left hand side portion of FIG. 3, the operations of the host computer 30 are illustrated. On the right hand side portion of FIG. 3, the operations of the CD ROM drive 44 are illustrated. In the central portion of FIG. 3, the operations of the development system 11 are illustrated. The dotted line data paths in FIG. 3 are for illustration purposes only to help those skilled in the art to understand how data flows during the operations that will be described hereinafter in greater detail.

Referring now to FIGS. 2 and 3, the ACK-REQ handshaking procedure 70 will be described. Beginning at an instruction box 71 (FIG. 3), the host computer 30 selects the CD-ROM drive unit 44. At box 72, the CD-ROM drive unit 44 acknowledges the connection and then at instruction box 73 requests that the host computer 30 send a command data block (CDB) 96 (FIG. 2) to instruct the unit 44 to perform a given operation. At instruction box 74, the computer 30 responds by sending the CDB 96 to the drive unit 44. In this regard, the CDB 96 consists of multiple-bytes of control information specifying what data is to be read from the target disc 13.

At instruction box 75, the drive unit 44 interprets the CDB 96 as a READ command causing its read head to be positioned to the desired data track to seek the data as indicated generally at box 76. Once the read head is positioned, the drive unit 44 at box 77 causes the data file to be retrieved as a valid data signal 91 and placed on the data line 48 (FIG. 1). The CD-ROM drive 44 then causes a REQ signal 92 (FIG. 2) to be generated to inform the host computer 30 that valid data 91 is available. The host computer 30 then attempts to read the data 91 as illustrated by a send signal 93 (FIG. 2). However, as the data line 48 is not connected to the controller 42, the read signal 93 enables the data on data line 49 to be read by the host computer and stored as shown in instruction box 79.

After reading the data on data line 49 the host computer generates an acknowledgement (ACK) signal 94 to inform the drive unit 44 that it can retrieve another data byte. Upon receipt of the acknowledgement (ACK) signal 94, the drive unit 44 drops its request (REQ) signal 92 which in turn causes the host computer 30 to drop its acknowledgement (ACK) signal 94. When the request (REQ) signal 92 drops the CD-ROM drive seeks another data byte and repeats the request/acknowledgement cycle as shown at instruction box 77.

When the host computer 30 sends the command data block 96 at instruction box 74, the computer 16 in the development system 10 at instruction box 78 intercepts the CDB 96 and decodes the control signal on the control line 46 at instruction box 79. For example, if a READ command is received, the central processing unit 16 will determine the location of the requested data on the target disc 13. While the CD-ROM drive 44 performs its seek operation at box 76, the computer 16, at instruction box 80, also seeks data by accessing its high speed storage unit 18 to locate the development data files which corresponds to the requested target data files. The computer 16 then places a valid development data file 95 on the data line 49 and waits for the REQ-ACK cycle at box 77 to be initiated between the CD-ROM drive 44 and host computer 30.

When the data transfer operation begins at instruction box 77, the computer 16 causes its data files 95 retrieved from the storage unit 18 to be substituted for the target data files 91 initially stored on the target disc 13 using the data path 49 (FIG. 1). In this regard, although the REQ signal 92 and the ACK signal 94 are issued from the CD-ROM unit 40 and host computer 30 respectively, the requested data comes from the hard disk 18 under the control of the computer 16 as shown in an instruction box 81. The computer 16 responds to the handshaking routine by sending its valid data files 95; however, to the host computer 30 it appears exactly as if the substituted development data originated from the CD-ROM drive unit 44 instead of the storage unit 18. The host computer 30 thus, as illustrated in box 82, reads the untested development system data for testing purposes.

A data path for the transfer of data 91 is shown between the CD ROM drive 44 operations and the development system 11 operations in FIG. 3. This dotted line data path is for illustration purposes only to help those skilled in the art regarding the flow of data. Similarly, the dotted line data path for the transfer of data 95 shown between the development system 11 operations and the host system computer 30 operations is for illustration purposes only to show the flow of data during the transfer data REC-ACK cycle.

After the untested data has been completely tested, the computer 16 causes the now tested data on the hard disk 18 to be transferred via the interface 17 to a master CD-ROM media such as a master media device (not shown) in the slow storage unit 19.

Referring again to FIG. 2, when the host computer 30 sends the command data block 96, both the CD-ROM drive 44 and the fast storage device 18 begin to access the requested data at T0 time. However, because the access time of the storage device 18 is so much faster than the access time of the CD-ROM drive 44, the device 18 places its valid data 95 on data line 49 at T1 time, while the drive unit 44 places its valid data 91 on data line 48 at T2 time.

When the drive unit 44 places its valid data 91 on the data line 48, the drive unit 44 asserts the REQ signal 92 at T3 time. The central processing unit 30 responds to the REQ signal 92 by reading the data signal 95 on the data lines 49 at T4 time.

After reading the data signal 95, the processing unit 30 causes the ACK signal 94 to be asserted at T5 time which signal acknowledges the data transfer and indicates to the drive unit 44 as well as the CPU 16 that the next data byte may be retrieved and placed on the data bus. The ACK signal 94 causes the REQ signal 92 to be negated at T6, which in turn, causes the ACK signal 94 to be negated at T8. New data is placed on the data lines 49 and 48 at T7 and T9 respectively, and another transfer or handshake cycle 77 is initiated at T10.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A software development system for testing a presentation program to be recorded on a CD-ROM device, said CD-ROM device to be used with a host system including a host computer and a storage unit having a storage media controller and a storage media drive unit for accessing target data files on the CD-ROM device, comprising:

high speed storage means for storing untested data files indicative of a presentation program to be developed for recording on the CD-ROM device;

processor means coupled to said high speed storage means and to the storage media controller for transferring the stored data files to the storage media controller in response to requests from the host computer to permit the data files to be tested;

said processor means responsive to control data supplied by the storage media controller in response to requests from the host computer to retrieve requested ones of the target data files for retrieving from said high speed storage means the untested data files to permit them to be transferred to the controller instead of the target data files;

said processor means further responsive to control data supplied by the storage media drive unit after an actual access time interval for indicating to the storage media controller that the target data files are ready to be transferred in response to the request from the host computer for substituting the untested data files retrieved from said high speed storage means for the target data files retrieved by the drive unit to permit the host computer to operate on the untested data files for testing purposes; and said processor means further responsive to other control data supplied by the storage media controller in response from the host computer that it has received the untested data files for completing the data file transfer from said high speed storage means to said host computer;

whereby the data file transfer timing between the host computer and said high speed storage means corresponds to the actual data file transfer timing that would occur between the host computer and the drive unit so that the untested data files can be tested and debugged to develop the presentation program prior to it being recorded on the CD-ROM device.

2. A software development system according to claim 1, wherein said processor means is a personal computer.

3. A software development system according to claim 1, wherein said high speed storage means is hard disk storage means.

4. A software development system according to claim 1, wherein the storage unit is a CD-ROM storage unit.

5. A software development system according to claim 1, wherein said processor means includes:

algorithm means responsive to the control data for causing selected untested data files to be retrieved from said high speed storage means for transfer to the storage media controller in response to the drive unit indicating that it has data available for transfer.

6. A software development system according to claim 5, further comprising read/write slow storage means for receiving the developed presentation program for storage and retrieval purposes.

7. A software development system according to claim 6, wherein said high speed storage means further stores subsequently tested data files indicative of the developed presentation program; and wherein said processor means includes means for causing the tested data files to be transferred to said read/write slow storage means for media device storage purposes.

8. A method for testing a presentation program to be recorded on a CD-ROM device, said CD-ROM device to be used with a host system including a host computer and storage unit having a storage media controller and a storage media drive unit for receiving the CD-ROM device, comprising:

storing untested data files indicative of a presentation program to be developed for recording on the CD-ROM device;

transferring the stored untested data files to the storage media controller in response to requests from the host computer to permit the data files to be tested;

retrieving from said high speed storage means the untested data files to permit them to be transferred to the controller instead of the target data files from the storage media drive unit;

responsive to control data supplied by the storage media drive unit after an actual access time interval for indicating to the storage media controller that the target data files are ready to be transferred in response to the request from the host computer for substituting the interested data files retrieved from said high speed storage means for the target data file retrieved by the drive unit to permit the host computer to operate on the untested data files for testing purposes; and responsive to other control data supplied by the storage media controller in response from the host computer that it has received the untested data files for completing the data file transfer from said high speed storage means to said host computer;

whereby the data file timing between the host computer and said high speed storage means corresponds to the actual data file transfer timing that would occur between the host computer and the drive unit so that the untested data files can be tested and debugged to develop the presentation program prior to it being recorded on the CD-ROM device.

9. A method according to claim 8, further comprising:

testing the untested data files to develop the presentation program;

compiling tested data files in response to the step of testing; and transferring the compiled tested data files to read/write slow storage means.

10. A method according to claim 9, wherein said read/write slow storage means is a CD-ROM unit.

11. A software development system for testing a presentation program to be recorded on a CD-ROM device, said CD-ROM device to be used with a host system including a host computer and storage unit having a/storage media controller and a storage media drive unit for receiving the CD-ROM device, comprising:

high speed storage means for storing untested data files indicative of a presentation program to be developed for recording on the CD-ROM device;

processor means coupled to said high speed storage means and to the storage media controller for transferring the stored untested data files to the storage media controller in response to requests from the host computer to permit the data files to be tested;

interface means for coupling control data lines between the storage media controller and the storage media drive unit to said processor means so it can be responsive to control data information transmitted between the controller and the drive unit;

said interface means for further coupling data information lines between the controller and said processor means and between the drive unit and said processor means so that target data files intended to be transferred by the drive unit to the controller can be intercepted by said processor means to permit it to substitute the untested data files in place of the target data files retrieved by the drive unit;

said processor means responsive to control data supplied by the storage media controller in response to requests from the host computer to retrieve target data files from the storage media drive unit for retrieving from said high speed storage means the untested data files to permit them to be transferred to the controller instead of the target data files from the storage media drive unit;

said processor means further responsive to control data supplied by the storage media drive unit after an actual access time interval for indicating to the storage media controller that the target data files are ready to be transferred in response to the request from the host computer for substituting the untested data files retrieved from said high speed storage means for the target data files retrieved by the drive unit to permit the host computer to operate on the untested data files for testing purposes; and said processor means further responsive to other control data supplied by the storage media controller in response from the host computer that it has received the untested data files for completing the data file transfer from said high speed storage means to said host computer;

whereby the data file transfer timing between the host computer and said high speed storage means corresponds to the actual data file transfer timing that would occur between the host computer and the drive unit so that the untested data files can be tested and debugged to develop the presentation program prior to it being recorded on the CD-ROM device.

12. A software development system for testing a presentation program to be recorded on a CD-ROM device, said CD-ROM device to be used with a host system including a host computer and a storage media controller, comprising:

a storage media drive unit responsive to the storage media controller for transferring target data files in response to data requests from the host computer, so that the host computer can operate on the data transferred to it in response to the data requests;

high speed storage means for storing untested data files indicative of a presentation program to be developed for recording on the CD-ROM device;

processor means coupled to said high speed storage means and to the storage media controller for transferring the stored untested data files to the storage media controller in response to requests from the host computer to permit the data files to be tested;

said processor means responsive to control data supplied by the storage media controller in response to requests from the host computer to retrieve target data files from the storage media drive unit for retrieving from said high speed storage means the untested data files to permit them to be transferred to the controller instead of the target data files from the storage media drive unit;

said processor means further responsive to control data supplied by the storage media drive unit after an actual access time interval for indicating to the storage media controller that the target data files are ready to be transferred in response to the request from the host computer for substituting the untested data files retrieved from said high speed storage means for the target data files retrieved by the drive unit to permit the host computer to operate on the untested data files for testing purposes; and said processor means further responsive to other control data supplied by the storage media controller in response from the host computer that it has received the untested data files for completing the data file transfer from said high speed storage means to said host computer;

whereby the data file transfer timing between the host computer and said high speed storage means corresponds to the actual data file transfer timing that would occur between the host computer and the drive unit so that the untested data files can be tested and debugged to develop the presentation program prior to it being recorded on the CD-ROM device.

13. A software development system according to claim 12, further comprising:

interface means for coupling control data lines between the storage media controller and the storage media drive unit to said processor means so it can be responsive to control data information transmitted between the controller and the drive unit;

said interface means for further coupling data information lines between the controller and said processor means and between the drive unit and said processor means so that target data files intended to be transferred by the drive unit to the controller can be intercepted by said processor means to permit it to substitute the untested data files in place of the target data files retrieved by the drive unit.

14. A software developmental system for being coupled to a host system for facilitating the development of a presentation program, said host system including a host computer and storage media controller for supplying application control information comprising:

application data generating means responsive to the controller unit for storing and retrieving desired stored application data;

storage drive means responsive to the application control information for retrieving target data information during an access time interval;

said drive means for sending the target data information and a request control signal after said access interval;

said generating means being responsive to the application control information and said request control signal for initiating a start time to send the desired stored application data to the controller in place of the retrieved target data information;

whereby the controller receives the request control signal from said drive means and the desired stored application data from said generating means for creating a desired application program.

15. In combination with host computer means for requesting information data indicative of an untested presentation program, a storage unit having a storage controller for supplying data request commands and a storage drive unit for accessing target data files stored on a storage media device, high speed memory means for storing data files indicative of the untested presentation program, and processor means coupled to the storage unit and the high speed memory means for sending retrieved untested data files in the place of requested target, playback means comprising:

means responsive to the data request commands for causing untested stored data files to be retrieved from the high speed memory means and stored temporarily until target data files are available from the storage media device in response to the actual access characteristics of the storage drive unit; and means responsive to the drive unit for sending the temporarily stored data files to the host computer means via the storage controller in place of said target data files.

16. A software development system responsive to data file requesting means for facilitating the development of a presentation program to be stored on a storage media device, comprising:

low speed storage means for retrieving target data files stored on the storage media device after an actual access time interval;

high speed storage means for retrieving untested data files indicative of a presentation program to be tested; and control means for supplying to the data file requesting means said untested data files in place of said target data files at a start time which begins substantially immediately after said actual access time interval;

said start time for sending the program data files to be tested corresponding to the actual time said low speed storage means attempts to send its target data files to said data file requesting means;

whereby the actual access characteristic of the low speed storage means are used to develop the presentation program.

17. A method for creating a tested presentation program comprising:

requesting target data files to be tested;

retrieving from low speed storage means the requested target data files after an actual access time interval;

retrieving from high speed storage means untested data files indicative of a presentation program to be tested;

supplying to data file requesting means said program data files in place of said target data files at a start time which begins substantially immediately after said actual access time interval;

said start time for sending the program data files to be tested corresponding to the actual time said low speed storage means attempts to send its target data files to said data file requesting means; and whereby the actual access characteristic of the low speed storage means are used to develop the presentation program.

* * * * *